United States Patent [19]

Parker

[11] Patent Number: 5,445,572
[45] Date of Patent: Aug. 29, 1995

[54] LOW COST, LIGHTWEIGHT DIFFERENTIAL

[76] Inventor: Bruce H. Parker, 26038 Charing Cross Rd., Valencia, Calif. 91355

[21] Appl. No.: 130,301

[22] Filed: Oct. 1, 1993

Related U.S. Application Data

[63] Continuation-in-part of Ser. No. 878,846, May 5, 1992, abandoned, and Ser. No. 17,238, Feb. 16, 1993, Pat. No. 5,390,753, each is a continuation-in-part of Ser. No. 642,225, Jan. 15, 1991, abandoned.

[51] Int. Cl.6 .......................... F16H 1/28; F16H 7/00
[52] U.S. Cl. ......................................... 475/182; 74/650
[58] Field of Search ............... 475/150, 182, 220, 223, 475/230, 236, 251; 74/650, 665 GC, 665 GE; 474/63, 73, 153

[56] References Cited

U.S. PATENT DOCUMENTS

| 436,970 | 9/1890 | Edison | 74/650 |
|---|---|---|---|
| 618,190 | 1/1899 | Sturgess | 74/650 |
| 808,002 | 12/1905 | Brockman | 475/182 |
| 1,025,331 | 5/1912 | Taylor | 74/650 |
| 1,028,009 | 5/1912 | Fancher | 475/182 |
| 1,129,366 | 2/1915 | Spangler | 74/650 X |
| 1,148,190 | 7/1915 | Pierce | 74/650 |
| 1,202,395 | 10/1916 | Ledeboer | 475/182 |
| 2,397,312 | 3/1946 | Forrest | 474/153 |
| 2,927,480 | 3/1960 | Schweickant | 74/650 |
| 3,202,017 | 8/1965 | Vance | 74/650 |
| 3,543,608 | 12/1970 | Meihak | 475/182 |
| 3,919,899 | 11/1975 | Parker, Jr. | 192/35 |
| 4,642,071 | 2/1987 | Botton | 474/63 |
| 5,390,753 | 2/1995 | Parker | 475/182 X |

FOREIGN PATENT DOCUMENTS

| 201254 | 3/1956 | Australia | 475/182 |
|---|---|---|---|
| 1246914 | 10/1960 | France | 475/182 |
| 932227 | 7/1955 | Germany | 475/182 |
| 2750442 | 5/1979 | Germany . | |
| 2058965 | 9/1980 | United Kingdom . | |

*Primary Examiner*—Khoi A. Ta
*Attorney, Agent, or Firm*—Louis J. Bachand

[57] ABSTRACT

A differential assembly in which a belt links gears on opposite sides of a carrier via idlers, which idlers are spaced to have synchronous interfittment of the belt teeth with the gear teeth and peripherally shaped to turn the belt flat for gear engagement with a minimum arc of partial engagement.

16 Claims, 5 Drawing Sheets

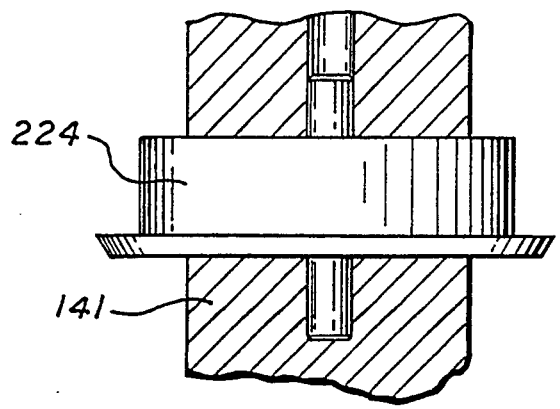
FIG. 4
FIG. 5
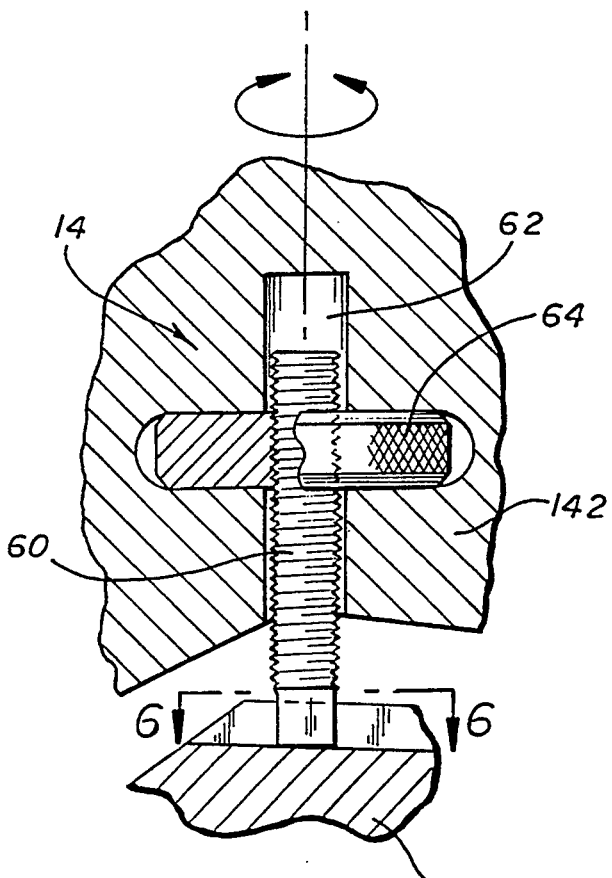
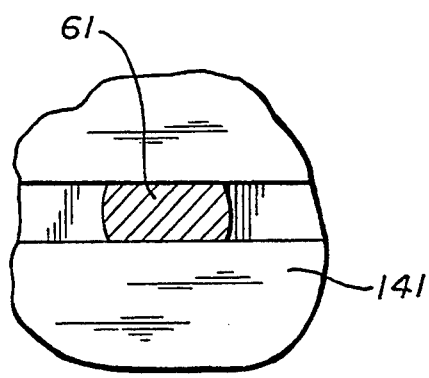
FIG. 6

LOW COST, LIGHTWEIGHT DIFFERENTIAL

REFERENCE TO RELATED APPLICATION

This application is a continuation in part of my application Ser. No. 07/878,846, filed May 5, 1992, now abandoned, and my application Ser. No. 08/017,238, filed Feb. 16, 1993, now U.S. Pat. No. 5,390,753, each of which is a continuation in part of my earlier filed application Ser. No. 07/642,225, filed Jan. 15, 1991, now abandoned, the disclosures of which are incorporated herein by this reference.

FIELD OF THE INVENTION

This invention relates to a novel differential, and more particularly to a differential that is low in weight, low in cost and remarkably functional in continuously coupling two differently turning shafts.

BACKGROUND

Differentials are used to compensate for differences in distances traveled by vehicle wheels, allowing power to be applied to each of a pair of wheels although each wheel travels a different distance, in cornering, for example. Numerous differentials are known. For the most part known differentials have comprised axle gears splined to the wheels axles, a differential case, differential pinion gears on a differential pinion shaft supported by the case, the pinion gears being meshed with the axle gears. A drive pinion driven by the engine drives a ring gear fixed to the case. This effects rotation of the differential case, the differential pinion shaft and differential pinion gears around with the ring gear. If the vehicle is being run down a straight road, the differential turns as a unit with the ring gear without relative movement between components. The differential pinion gears do not rotate on the pinion shaft. Equal torque is applied to the axle gears so that both driven wheels rotate at the same speed. Around a corner, however, the outer wheel must travel farther than the inner wheel in a given period of time and thus must turn faster than the inner wheel. Now the two differential pinion gears rotate on the pinion shaft, so that the outer wheel may turn more rapidly than the inner. On an opposite direction turn, the pinion gears rotate in the opposite direction, to the same effect.

Characteristically, the usual differential is a massive affair with the case and gears made of substantial pieces of heavy metal, contributing unduly to the weight and power requirements of vehicles, and foreclosing modest applications such as golf carts and wheel chairs from efficient differentials.

A different type of differential is disclosed in U.S. Pat. No. 3,919,899 to Parker. In this patent, a differential is described comprising a pair of axle gears affixed to tubular axles, a planetary gear, a central axle passing through the tubular axles to align the unit, and a ring gear connected to the planetary gear and rotatably mounted around the central shaft. While lightweight and effective, this differential still employs a form of pinion gear, the planetary gear, and thus still has weight which is desirably lessened.

Belt and gear devices have been shown in U.S. Pat. No. 0,436,970 to Edison, and in U.S. Pat. No. 3,543,608 to Mehiak, where a smooth belt was wrapped about smooth gears with no means of guiding the belt against wear. In Brit. App. No. 2 058 965, published 15 Apr. 1981 to Gauvain, separate belts are shown engaged with toothed gears in a widely spaced arrangement that does not allow compactness.

SUMMARY OF THE INVENTION

It is an object therefore of the present invention to provide a differential which is effective and efficient in compensating for different rate and distances of travel of vehicle wheels, which is free of much of the conventional gearing and conventional casing and accordingly remarkably lightweight. It is another object to provide such a differential in which the axle-coupled gears are spaced across a simplified differential having only a belt maintained folded on itself as a differential device. It is another object to maintain synchronous interfittment of belt and gears by careful control of the length of the belt path, to avoid tooth wear and ratcheting, to provide guides to protect against slippage of the belt from their path when encountering high torque, high speeds or acceleration jerk, to shape the idlers to direct the belt flat onto the gears to limit the arc of partial engagement otherwise experienced and reduce wear, all while maintaining compactness of arrangement. Other objects will appear hereinafter.

These and other objects to become apparent hereinafter are realized in accordance with the invention by provision of a differential assembly comprising a central shaft, a carrier rotatable on the central shaft, first and second tubular gear shafts journaled on the central shaft on opposite sides of the carrier, first and second toothed gears mounted to the gear shafts, first and second idlers transversely mounted on the carrier, means linking the first and second gears for differential rotation including a toothed endless belt disposed along a path having longitudinal portions centered on the first and second gears and transverse portions centered on the idlers, the path length providing synchronous interfittment of the teeth on the belt with the teeth on the first and second gears, the idlers being peripherally shaped to turn the belt flat to the first and second gears in transition from transverse to longitudinal disposition.

In this and like embodiments, there is typically also included retaining means retaining the belt on the idlers, each the retaining means comprising a roller in rolling engagement with the belt on each the idler, the retaining means roller is shaped complementary to the idler roll opposite, the carrier mounts a first axle pin for rotation of the idler, and a second axle pin for rotation of the retaining means roller, the first and second axle pins being parallel, the peripheral shape bevel on the retaining means roller being the complement of the idler shape opposed thereto.

In another embodiment, the idlers are adjustably spaced on the carrier for adjusting the length of the belt path to ensure synchronous interfittment of the belt teeth with the first and second gear teeth, the carrier comprises a separable portion carrying one of the idlers, and there is also included means controlling separation of the carrier portion to thereby vary the spacing of the idlers and thereby the length of the belt path, such portion separation controlling means typically comprising a thread-adjustable shaft in one carrier portion, the shaft bearing against a second carrier portion whereby thread-adjustment of the shaft adjusts the relative spacing of the first and second carrier portions, the relative position of said idlers, and the length of the belt path.

In other embodiments, there is included a plurality of the controlling means shafts, each lying chordally of the carrier, and a turning wheel for turning the thread-adjustable shaft.

In yet another embodiment, there is further included means to drive the carrier comprising a prime mover and a drive gear coupled to the carrier. In this and like embodiments, the drive gear comprises a ring gear mounting the carrier, the carrier having separable portions including a first portion having an inner mounting shoulder and a shoulder flange, and a second portion captured against the first portion inner mounting shoulder and shoulder flange for separate arcuate movement, there is further included an axle for each idler, the carrier defining a bore for each the axle, the carrier bores being closed outwardly by the first portion inner mounting shoulder, whereby each the idler axle is captured within the carrier bore in the assembled condition of the differential, there is further included retaining rollers opposed to each idler, an axle for each retaining roller, the carrier defining a bore for each the retaining roller axle, the retaining roller axle bores being closed outwardly by the carrier first portion inner mounting shoulder, whereby each the retaining roller axle is captured within its the carrier bore in the assembled condition of the differential.

Typically in these embodiments, each idler is paired with a retaining roller, the axles of the pairs being parallel.

In an further embodiment, the gears, idlers and linking belt comprise a first belt arrangement, and there is further included a second belt arrangement coaxial with the first belt arrangement.

In a preferred embodiment, the invention differential assembly comprises a drive gear, a central shaft about which the drive gear rotates, a carrier rotatable with the drive gear, first and second tubular gear shafts journaled on the central shaft on opposite sides of the carrier, first and second toothed gears mounted to the gear shafts adjacent the carrier, first and second idlers transversely mounted on the carrier between the planes of the gears, means linking the first and second gears for differential rotation including a toothed endless belt disposed along a path having longitudinal portions centered on the first and second gears and transverse portions centered on the idlers, the path length providing synchronous interfittment of the teeth on the belt with the teeth on the first and second gears, the idlers being beveled to turn the belt flat to the first and second gears in transition from its transverse to its longitudinal disposition.

In this and like embodiments there is typically further included complementary retaining rollers opposed to the idlers for retaining the belt in contact with the idlers.

The invention further contemplates the combination including a vehicle having a prime mover and drive wheels, and a differential assembly comprising a drive gear, a central shaft about which the drive gear rotates, a carrier rotatable with the drive gear, first and second tubular gear shafts journaled on the central shaft on opposite sides of the carrier, the driver wheels being fixed to the gear shafts, first and second toothed gears mounted to the gear shafts adjacent the carrier, the gears and carrier lying in parallel radial planes, first and second idlers transversely mounted on the carrier between the planes of the gears, means linking the first and second gears for differential rotation including a toothed endless belt disposed along a path having longitudinal portions centered on the first and second gears and transverse portions centered on the idlers, the path length providing synchronous interfittment of the teeth on the belt with the teeth on the first and second gears, the idlers being peripherally beveled to turn the belt flat to the first and second gears in transition from its transverse to its longitudinal disposition, retaining rollers opposite the idlers in belt retaining relation, the rollers and the idlers having parallel axles mounted in bores within the carrier, the axles being captured in the bores by the carrier, the carrier having a separable portion carrying at least one of the idlers, and means to adjust the relative position of the separable carrier portion to the remainder of the carrier, the adjusting means comprising a threaded adjustment shaft acting to space the carrier portion from the remainder of the carrier, whereby the path of the belt is shortened or lengthened to maintain synchronous interfittment of the belt teeth with the teeth of the gears.

BRIEF DESCRIPTION OF THE DRAWINGS

The invention will be further described as to an illustrative embodiment in conjunction with the attached drawings in which:

FIG. 4 is a view taken on line 4—4 in FIG. 2;

FIG. 5 is a view taken on line 5—5 in FIG. 2;

FIG. 6 is a view taken on line 6—6 in FIG. 5;

DETAILED DESCRIPTION

Figure 1:
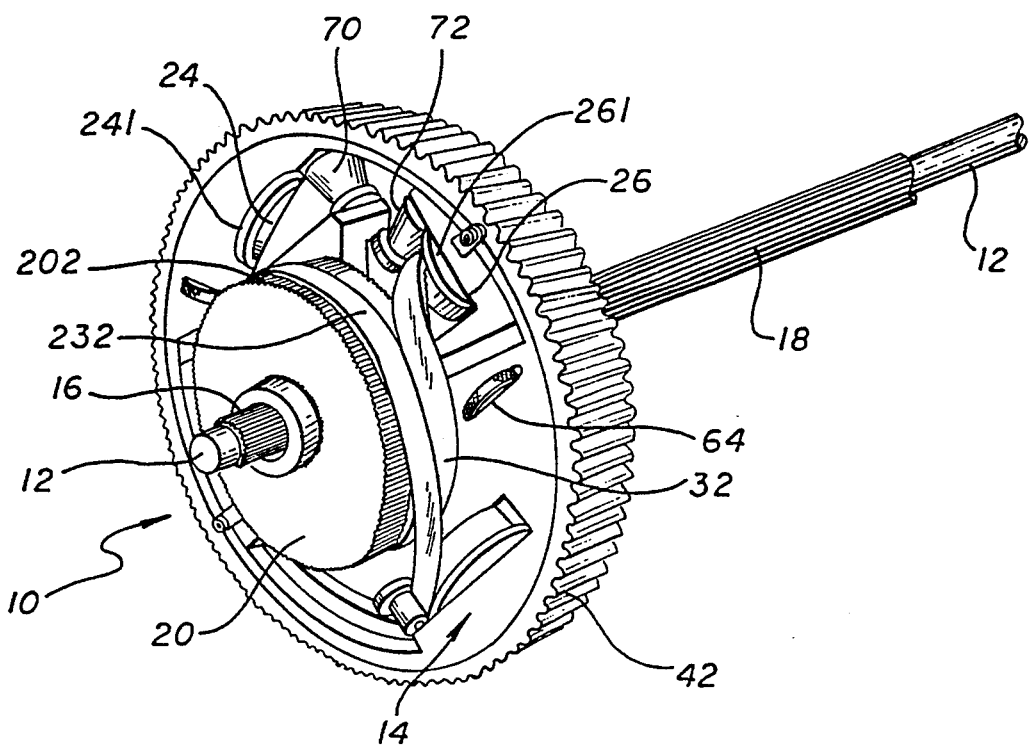
FIG. 1 is an isometric view of the differential assembly.
Figure 2:
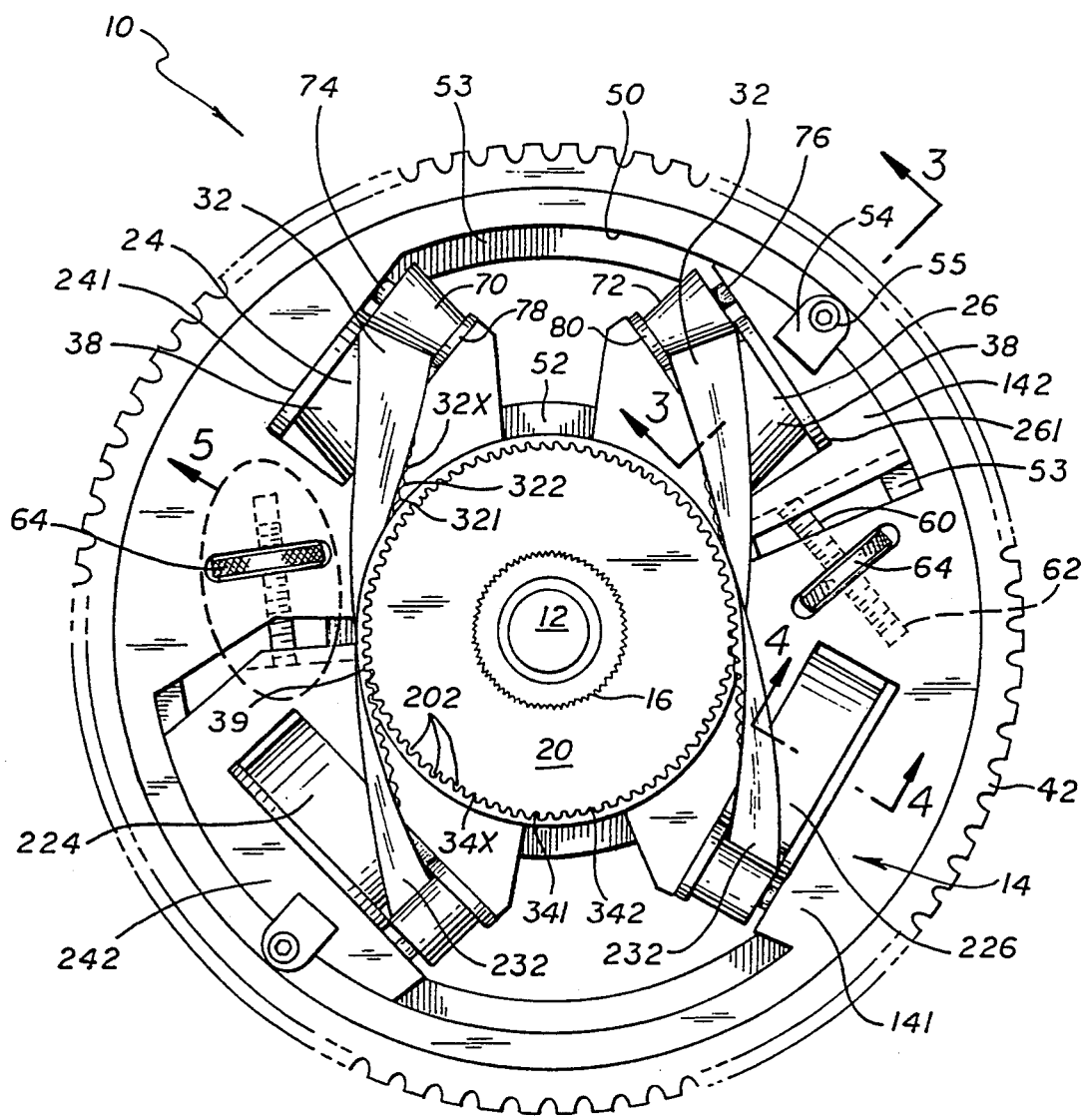
FIG. 2 is a side elevational view thereof.
Figure 7:
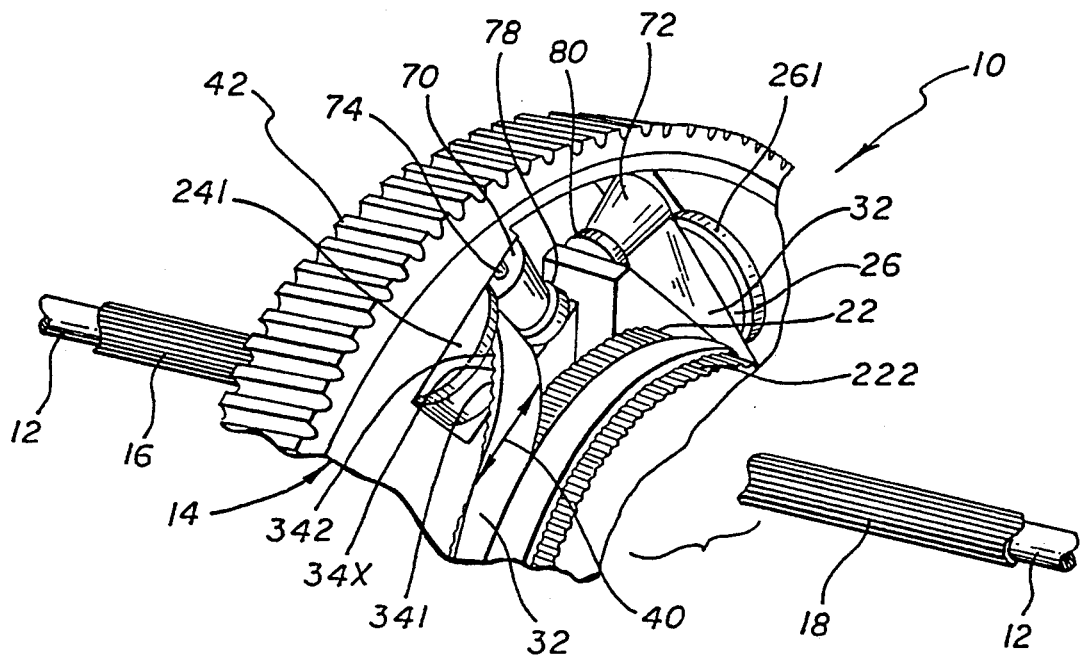
FIG. 7 is a fragmentary isometric view of the differential assembly.
Figure 8:
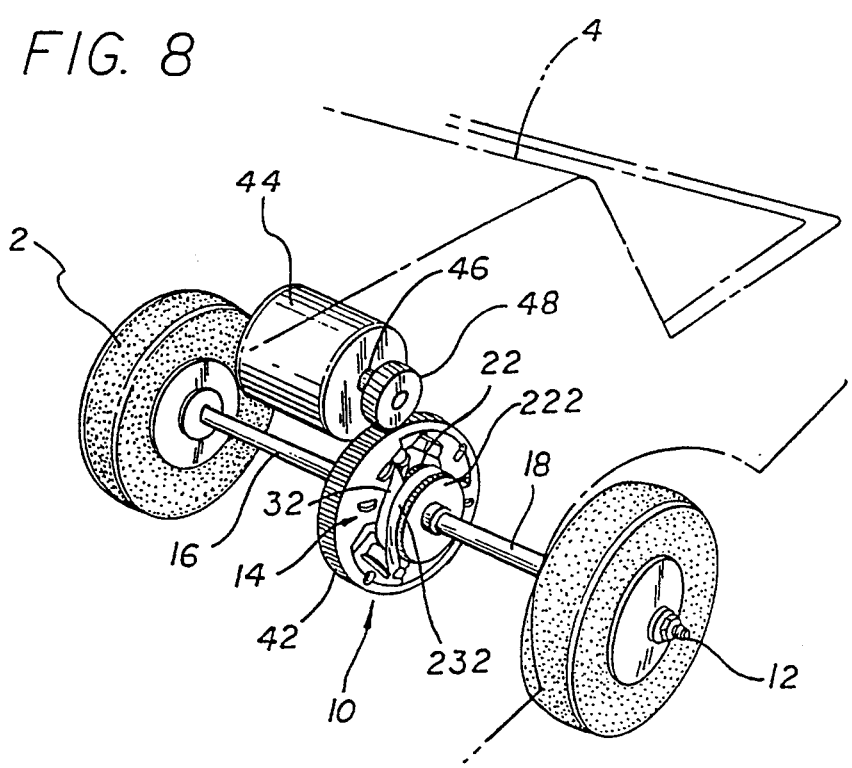
FIG. 8 is a partly isometric, partly schematic view of the differential assembly installed in a vehicle.

With reference now to the drawings in detail, in FIGS. 1, 2 and 7, an illustrative form of the differential assembly of the invention is shown at 10. Differential assembly 10 comprises a solid, elongated, steel central shaft 12, a disc shaped metal carrier 14 journaled on the central shaft, a first tubular gear shaft 16 on one side of the carrier, and a second tubular gear shaft 18 on the other side of the carrier. The tubular gear shafts 16, 18 are journaled on the central shaft 12. The wheels 2 of a vehicle 4 are fixed to gear shafts 16, 18 (FIG. 8). The assembly 10 further comprises a first toothed gear 20 fixed to the first tubular gear shaft 16, and a second toothed gear 22 fixed to the second tubular gear shaft 18. First and second idlers 24, 26 are pivotedly mounted in carrier 14 on axles 28 (FIG. 3) between the radial planes of the gears 20, 22, as shown.

The differential assembly 10 further comprises means to link the first and second toothed gears 20, 22 respectively, in the form of a toothed endless belt 32. The belt 32 is disposed along a path around each of the gears 20, 22 and each of idlers 24, 26. The length of the belt 32 path is critically such that the teeth of the belt achieve synchronous interfittment with the teeth 202, 222 respectively of both of gears 20, 22.

The belt 32 used is preferably of the type presently sold for sports vehicle applications, such as Goodyear's high capacity synchronous drive belts drive belts (Goodyear catalog 821-950-723). These and other suitable belts are tough, durable, dimensionally stable and quite stretch resistant to be nonelongating under load, flexible, solid bands of rubber resistant to to environmental hazards and reinforced, e.g. with fillers, fibers and cords. The preferred configuration of the belt 32 is an elongated web having integrally formed cogs 321 of a tooth profile suited for full mating synchronous interfittment with the lands 341, 342 between the teeth 202, 222 of the gears 20, 22.

By synchronous interfittment is meant, with particular reference to FIG. 2, that each tooth e.g. 321, 322, 32x, etc. of the belt 32 which is disposed flat to the opposed gear 20 is in perfect mating registration with the lands 341, 342, 34x, etc. between the teeth 202 of the gear, neither ahead or behind the point of full depth and width mating. The interfittment is synchronous because the belt teeth 32x simultaneously interfit with the teeth 202, 222 of both of the gears 20 and 22 although these gears are spaced apart, the idlers 24, 26 intervene, and the belt 32 is twisted in the course of traversing the belt path. The failure to recognize the need for synchronous interfittment of the belt 32 and both gears 20, 22 leads to partial engagement of the opposed teeth, slippage, ratcheting of the teeth, undue belt wear, loss of efficiency and inadequate performance. On the other hand achieving synchronous interfittment, as by careful spacing of the gears 20, 22, and precisely adjusting the length of the belt 32 to such spacing as by shifting the relative positions of the gears 20, 22 and idlers 24, 26, as will be described below, leads to full engagement of the opposed teeth, no slippage or ratcheting, minimal wear of the belt, very high efficiencies, exceeding those of conventional differentials, and remarkable performance.

The belt 32 traverses the gears 20, 22 in a longitudinally disposed manner, and the idlers 24, 26 in a transversely disposed manner as shown, so that the belt path has alternating longitudinal and transverse portions centered respectively on the gears 20, 22 and the idlers 24, 26. The idlers 24, 26 are peripherally shaped to have a beveled surface 38 over which the belt 32 travels. The degree of bevel for the embodiment shown is preferably about 13.5° and can be higher or lower, e.g. 10° to 25°, See FIG. 3, the main desideratum being to so direct the belt 32 leaving the idler 24 that the belt approximates being flat to the peripheral edge 39 of the gear 20 upon leaving the idler and is indeed flat to that edge as quickly as possible. Failure to so guide the belt 32 leads to undue wear as the belt teeth 321, etc. are subject to undue loads by being only partially engaged. In the present embodiment, best shown in FIG. 7, the belt 32 is twisted the least amount necessary to achieve transition between transverse disposition and longitudinal disposition by having the idler 24 beveled as shown. In approaching the gear 22, the belt 32 is guided flat onto the gear, for full engagement. There is a necessary transition in which the belt 32 is not engaged fully across the width of the gear 20 lands (e.g. 341, 342, 34x) and this arc of partial engagement, shown by the double-headed arrow 40, in FIG. 7, is desirably minimized in the differential design by tailoring the beveling of the idlers 24, 26 to the size and location of the gear (20, 22) which is to receive the belt.

The differential assembly 10 further includes in the illustrated embodiment a drive gear in the form of a ring gear 42. Ring gear 42 is driven by a prime mover such as motor 44, FIG. 8, whose output shaft 46 turns gear 48 engaged with the ring gear. Ring gear 42 circumscribes the carrier 14 and is fixed to the carrier portion 141. Carrier portion 141 defines an inner mounting shoulder 50, inner shoulder flange 52 and outer shoulder flange 53. Carrier portion 142 is arcuately shiftable relative to carrier portion 141 and is held in position for such shifting against inner and outer shoulder flanges 52, 53 by fasteners 54 pivoted on bolts 55 anchored in carrier portion 141. Shifting of the carrier portion 142 is controlled by threaded shaft 60 which extends from a tapped bore 62 in carrier portion 141 to the carrier portion 142. Knurled wheel 64 is rotated to extend the threaded shaft 60 more or less to correspondingly change the spacing of carrier portions 141 and 142 by engagement of shaft 60 with foot 61 in fixed carrier portion 141, FIG. 6. Carrier portion 142 carries idler 24 which is confined in its translational movement with carrier portion 142 movement by belt 32. Threaded shaft 60 varies the length of the belt path by shifting the idler 24 with carrier portion 142, the length being carefully adjusted for each differential assembly 10 to ensure synchronous interfittment of the belt 32 with the gears 20, 22.

Figure 3:
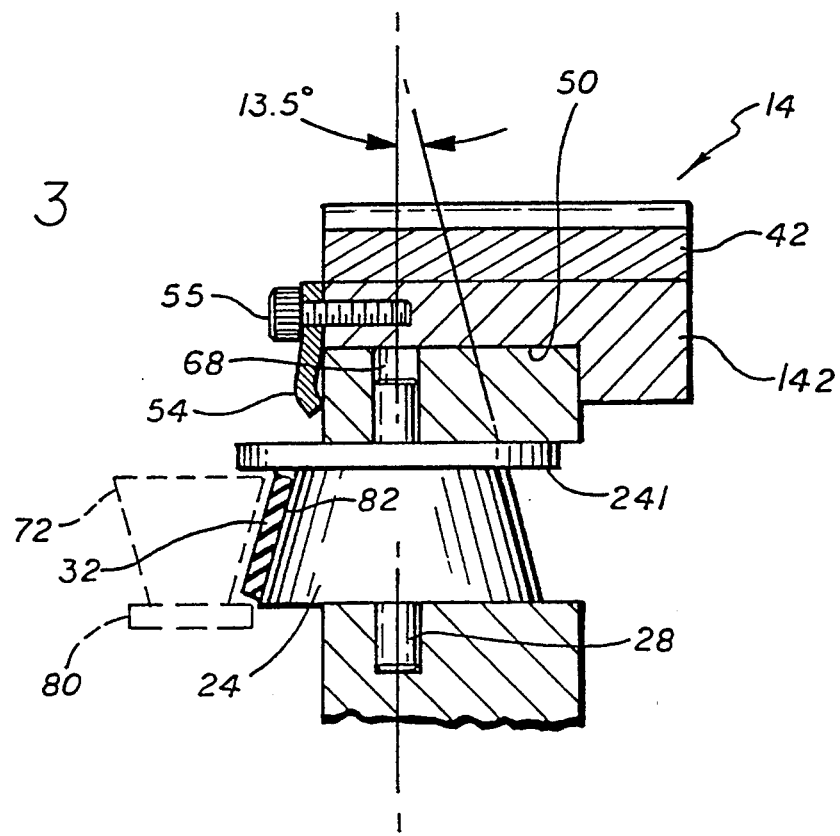
FIG. 3 is a view taken on line 3—3 in FIG. 2.

As best shown in FIG. 3, the idler 24 is mounted on an axle 28 disposed in bore 68 in carrier portion 142, the axle being inserted into the bore and the bore thereafter outwardly closed by fitting the carrier portion 142 into the inner mounting shoulder 50 of the carrier portion 141. Idler 26 is mounted in place in the same way (not shown).

Idlers 24, 26 are flanged at 241, 261, respectively, to protect against the belt 32 slipping off the idler, see FIG. 3. Each idler 24, 26 is also provided with a retaining roller 70, 72. Retaining rollers 70, 72 are mounted on axles 74, 76 disposed in bores (not shown) parallel to the axles, e.g. axle 28, on which the idlers 24, 26 turn, and their axles are similarly captured in their respective bores (not shown) by the inner mounting shoulder 50 of the carrier portion 141. The retaining rollers 70, 72 are of a complementary shape to the opposed idlers 24, 26, e.g. beveled to the complementary angle, and are flanged at 78, 80 as shown, to define a gap 82 closed above and below by the opposed flanges of the idlers and retaining rollers and closed from side to side by the idlers and the retaining rollers, the gap being of a size to just accommodate the belt 32 see FIG. 3.

In operation of the differential assembly 10, any tendency of the belt to jump, e.g. from starting torque, overloads, acceleration jerk or other use conditions is controlled by the retaining rollers and idlers and their respective flanges.

Figure 9:
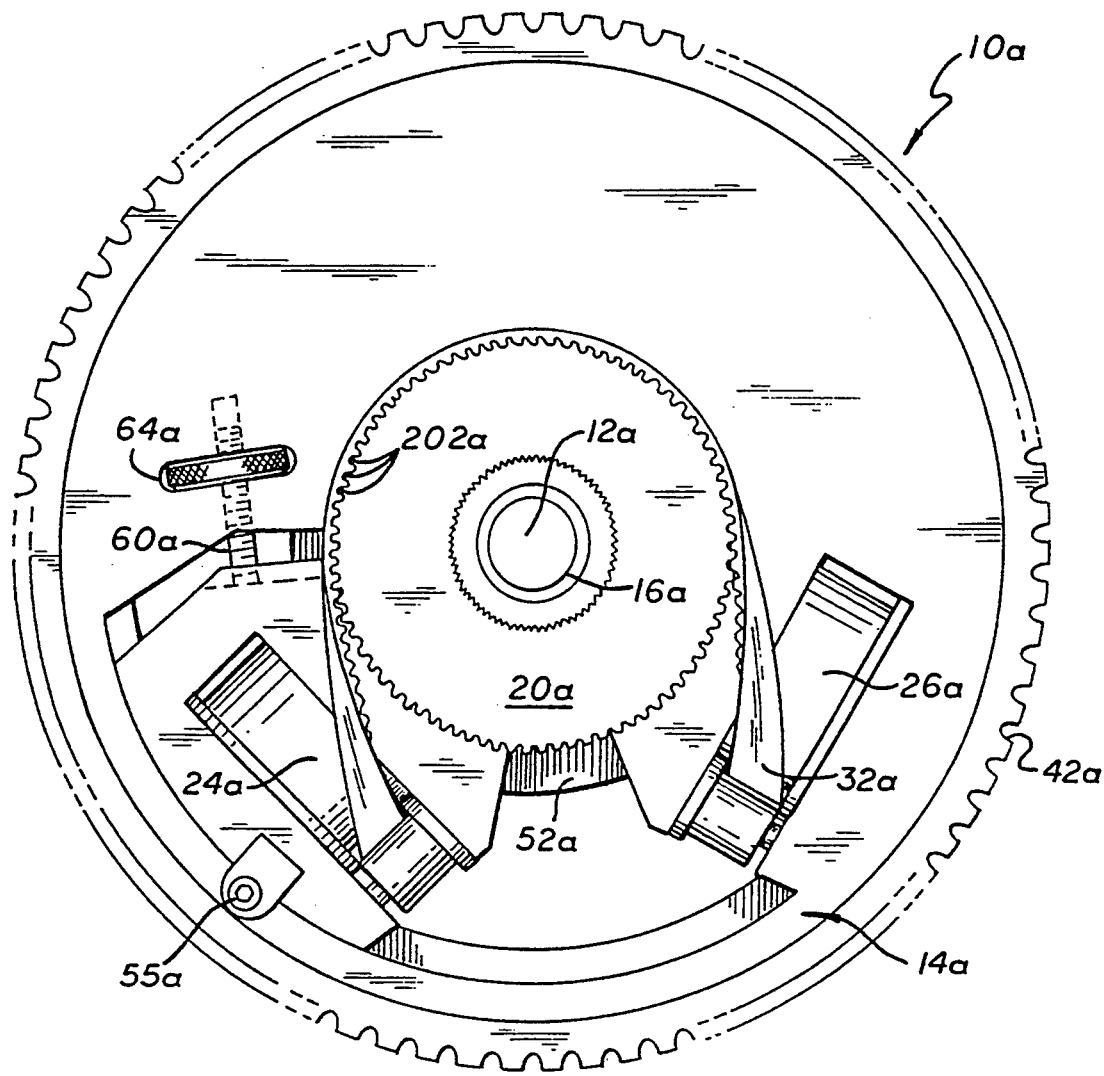
FIG. 9 is a view like FIG. 1 of an alternate form of the differential assembly.

With reference to FIG. 9, wherein like parts to those shown in FIGS. 1-8 are given like numerals plus a lower case "a", the differential assembly 10a comprises central shaft 12a, a disc shaped metal carrier 14a journaled on the central shaft, a first tubular gear shaft 16a on one side of the corner (another tubular gear shaft, not shown, is on the other side of the corner). The tubular gear shaft 16a (and opposite side counterpart) are journaled on the central shaft 12a, and as shown in connection with the previous embodiment, vehicle wheels are fixed to the gear shafts. The assembly 10a further comprises a first toothed gear 20a fixed to the gear shaft 16a. A second counterpart toothed gear to gear 20a, not shown, is fixed to the second tubular gear shaft also not shown. First and second idlers 24a, 26a are pivotedly mounted in carrier 14a on axles not shown but as depicted in FIGS. 1 and 2 for idlers 24, 26. Differential assembly 10a further comprises means to link the toothed gear 20a with in the form of a toothed endless belt 32a. The belt 32a is disposed along a path around the gear 20a (and the counterpart gear not shown) as illustrated in the Figure.

As in the previous embodiment the length of the belt 32 path is critically such that the teeth of the belt achieve synchronous interfitment with the teeth 202a of gears 20a. Operation of the differential assembly 10a is like that of differential assembly 10 other than the presence of two belts 32 and associated second set of gears 20, 22 in the assembly 10 device. The embodiment shown in FIG. 1–8 incorporates two belts, belt 32 and belt 232, each of which has the same function, already described for belt 32. The purpose of double belts, triple or other number is to increase the amount of power that can be transmitted for a given size of differential, belt and gearing.

The double belt embodiments will be described by reference to an inner belt and an outer belt assuming the carrier 14 to be at the center of the differential assembly 10 so that the closer belt to the carrier is the inner belt, i.e. belt 32.

The carrier 14 has in addition to its separable portion 142 a further separable portion 242. A third idler 224 is carried on the carrier portion 242 for shifting in the manner of idler 24, using a different threaded shaft 260, operating in tapped bore 262 by means of knurled wheel 264 which projects from the plane of carrier 14 to be digitally operated for purposes of adjusting the belt 232 path length to the optimum for synchronous interfittment of the belt with the outer gears 220, 222. A fourth idler 226 is mounted in carrier 141 cooperating with idler 224 and outer gears 220, 222 each mounted on tubular shafts 16 and 18 to which inner gears 20 and 22 are also mounted. Belt 232 wraps around the idlers 224, 226 and the outer gears 220, 222 as shown and operates in the same manner as belt 32.

Idler 224 is mounted on axle 228 disposed in bore 268, and captured by inner mounting shoulder 50 of the carrier portion 141, as best shown in FIG. 4. Idler 226 is similarly mounted. It will be noted that while idlers 224, 226 are not beveled on their belt engaging surfaces, these idler surfaces are peripherally shaped to turn the belt 232 flat to the gears 220, 222, the outboard location and greater diameter of the outer belt idlers making the angle and twist of the belt between the idler and the gear small enough that beveling is not required to minimize the arc of partial engagement, cf. 40 in FIG. 7.

There is thus provided a low cost light weight differential which uses a carrier having separable portions to relatively shift the idlers so as to adjust the endless belt path to precisely the length need to ensure synchronous interfittment of the belt tooth pattern with the tooth pattern on the gears fixed to the same shafts as the drive wheels. The idlers are peripherally shaped to turn the belt toward a flat to the gear edge disposition while carried on the idler, a more effective turning of the belt than simply hanging the belt in midair for turning as has been done previously.

I claim:

1. A differential assembly comprising a central shaft, a carrier rotatable on said central shaft, first and second tubular gear shafts journaled on said central shaft on opposite sides of said carrier, first and second toothed gears mounted to said gear shafts, first and second idlers mounted on said carrier transverse to the plane of rotation of said first and second toothed gears, means linking said first and second gears for differential rotation including a toothed endless belt disposed along a path having a length, said belt having longitudinal portions on said first and second gears and transverse portions on said idlers, said path providing full width and depth mating interfitment of the teeth on said belt synchronously with the teeth on said first and second gears, said idlers being peripherally shaped to turn said belt flat to said first and second gears in transition from transverse to longitudinal disposition, and retaining rollers in rolling engagement with said belt to retain said belt on said idlers.

2. The differential assembly according to claim 1, in which said retaining means roller is opposite to and shaped complementary to said idler roll.

3. The differential assembly according to claim 2, in which said carrier mounts a first axle pin for rotation of said idler, and a second axle pin for rotation of said retaining means roller, said first and second axle pins being parallel, the peripheral shape on said retaining means roller being the complement of said idler shape opposed thereto.

4. The differential assembly according to claim 1, in which said idlers are movably mounted on said carrier for adjusting the length of said belt path to ensure said interfitment of said belt teeth with said first and second gear teeth.

5. The differential assembly according to claim 4, in which said carrier comprises relatively movable portions, one of said carrier portions carrying one of said idlers, and including also means controlling relative movement of said carrier portions to thereby vary the spacing of said idlers and thereby the length of said belt path.

6. The differential assembly according to claim 5, in which said carrier portion movement controlling means comprises a thread-adjustable shaft in a first carrier portion, said shaft bearing against a second carrier portion whereby thread-adjustment of said shaft adjusts the relative spacing of said first and second carrier portions, the relative position of said idlers, and the length of said belt path.

7. The differential assembly according to claim 6, including a plurality of said controlling means shafts.

8. The differential assembly according to claim 6, including also a turning wheel for turning said thread-adjustable shaft.

9. The differential assembly according to claim 1, including also means to drive said carrier comprising a prime mover and a drive gear coupled to said carrier.

10. The differential assembly according to claim 9, in which said drive gear comprises a ring gear, said ring gear mounting said carrier, said carrier having relatively movable portions including a first portion having an inner mounting shoulder and shoulder flange and a second portion captured against said inner mounting shoulder and shoulder flange for relative arcuate movement.

11. The differential according to claim 10, including also an axle for each said idler, said carrier defining a bore for each said axle, said carrier bores being closed outwardly by said carrier first portion inner mounting shoulder, whereby each said idler axle is captured within its said carrier bore in the assembled condition of said differential.

12. The differential according to claim 11, in which said retaining rollers are opposed to said idlers, an axle for each retaining roller, said carrier defining a bore for each said retaining roller axle, said retaining roller axle bores being closed outwardly by said carrier first portion inner mounting shoulder, whereby each said retaining roller axle is captured within its said carrier bore in the assembled condition of said differential.

13. The differential assembly according to claim 12, in which each said idler is paired with a retaining roller, the axles of said pairs being parallel.

14. The differential assembly according to claim 1, in which said gears, idlers and linking belt comprise a first belt arrangement on said carrier, and including also a second belt arrangement on said carrier, said second belt arrangement comprising first and second idlers mounted on said carrier across said central shaft from said first belt arrangement first and second idlers and transverse to the plane of rotation of said first and second toothed gears, a second toothed endless belt further linking said first and second gears, said belt being disposed along a path having a length, said belt having longitudinal portions on said first and second gears and transverse portions on said idlers, said path length providing full width and depth mating interfitment of the teeth on said second belt synchronously with the teeth on said first and second gears oppositely facing and in axially displaced relation to said first belt arrangement belt on said first and second gears, said second belt arrangement idlers being peripherally shaped to turn said belt flat to said first and second gears in transition from transverse to longitudinal disposition, and retaining rollers in rolling engagement with said second belt to retain said second belt on said second belt arrangement idlers.

15. A differential assembly comprising a drive gear, a central shaft about which said drive gear rotates, a carrier rotating with said drive gear, first and second tubular gear shafts journaled on said central shaft on opposite sides of said carrier, first and second toothed gears mounted to said gear shafts adjacent said carrier, first and second idlers transversely mounted on said carrier between the planes of said gears, means linking said first and second gears for differential rotation including a toothed endless belt disposed along a path having a length, said belt having longitudinal portions on said first and second gears and transverse portions on said idlers, said path length providing depth and width interfitment of the teeth on said belt with the teeth synchronously on said first and second gears, said idlers being beveled to turn said belt flat to said first and second gears in transition from its transverse to its longitudinal disposition, and complementary retaining rollers opposed to said idlers for retaining said belt in contact with said idlers.

16. In combination, a vehicle having a prime mover and drive wheels, and a differential assembly comprising a drive gear, a central shaft and about which said drive gear rotates, a carrier rotating with said drive gear, first and second tubular gear shafts journaled on said central shaft on opposite sides of said carrier, said drive wheels being fixed to said gear shafts, first and second toothed gears mounted to said gear shafts adjacent said carrier, said gears and carrier lying in parallel radial planes, first and second idlers mounted on said carrier transverse to and between the planes of said gears, means linking said first and second gears for differential rotation including a toothed endless belt disposed along a path having a predetermined length, said belt having longitudinal portions around said first and second gears and transverse portions around said idlers, said path length providing full depth and width mating interfitment of the teeth on said belt synchronously with the teeth on both of said first and second gears to which said belt teeth are flat, said idlers being peripherally beveled to turn said belt flat to said first and second gears in transition from its transverse to its longitudinal disposition, retaining rollers opposite said idlers in belt retaining relation, said rollers and said idlers having parallel axles mounted in bores within said carrier, said axles being captured in said bores by said carrier, said carrier having a relatively movable portion carrying at least one of said idlers, and means to adjust the relative position of said movable carrier portion relative said carrier, said adjusting means comprising a threaded adjustment shaft acting to space said movable carrier portion relative to said carrier, whereby the path of said belt is shortened or lengthened to maintain interfitment of said belt teeth with the teeth of said gears.

* * * * *